United States Patent [19]

Martin et al.

[11] 3,853,809

[45] Dec. 10, 1974

[54] MIXTURES OF PARTICULATE FLUORINATED POLYMERS AND RUBBERS

[75] Inventors: Jon W. Martin; Jeffrey L. Bell; John F. Jones, all of Orange, Calif.

[73] Assignee: TRW Inc., Redondo Beach, Calif.

[22] Filed: July 16, 1973

[21] Appl. No.: 379,894

Related U.S. Application Data

[63] Continuation of Ser. No. 230,086, Feb. 28, 1972, abandoned.

[52] U.S. Cl. ...... 260/42.37, 260/33.6 F, 260/42.32, 260/890
[51] Int. Cl. .................... C08c 11/14, C08f 29/16
[58] Field of Search ....... 260/33.6 AO, 33.6 F, 884, 260/890, 42.37

[56] References Cited
UNITED STATES PATENTS

| | | | |
|---|---|---|---|
| 2,906,123 | 9/1959 | Vernet | 73/368.3 |
| 3,397,166 | 8/1968 | Schmiddle | 260/33.6 |
| 3,558,538 | 1/1971 | Wollel | 260/23 |
| 3,586,661 | 1/1971 | Parris | 260/85.3 |
| 3,595,851 | 7/1971 | Boutsicaris | 260/94.7 |
| 3,630,974 | 12/1971 | Ladocsi | 260/5 |
| 3,661,823 | 4/1972 | Fix | 260/17.4 BB |
| 3,682,859 | 8/1972 | Taylor | 260/41 AG |
| 3,696,062 | 10/1972 | Lesage | 260/5 |
| 3,769,370 | 10/1973 | Martin et al. | 260/890 |

*Primary Examiner*—Morris Liebman
*Assistant Examiner*—H. H. Fletcher
*Attorney, Agent, or Firm*—Willie Krawitz; Daniel T. Anderson; Alan D. Akers

[57] ABSTRACT

Particulate fluorinated polymers such as Teflon are incorporated into rubber bases by first predispersing Teflon powder into a low molecular weight hydrocarbon such as a liquid polybutadiene and then mixing this predispersion into the rubber base. If desired, the predispersion of Teflon and polybutadiene may be first converted into a free-flowing powder by the addition of a dry inert filler such as clay, carbon black, silica, alumina, etc., and then incorporated into the rubber base. Alternately, the Teflon-polybutadiene predispersion may be masterbatched with a small amount of the rubber matrix before being mixed into the rubber base.

4 Claims, No Drawings

MIXTURES OF PARTICULATE FLUORINATED POLYMERS AND RUBBERS

BACKGROUND OF THE INVENTION

This invention was made pursuant to a contract with the Department of Defense.

This application is a continuation of application Ser. No. 230,086, filed 2-28-72, now abandoned.

This invention relates to a process for incorporating particulate fluorinated resins uniformly into a rubber base and, more specifically, to a process for mixing, as a uniform dispersion, fluorinated resins such as polytetrafluoroethylene into a rubber base such as ethylene/propylene diene terpolymers (EPDM). The present invention also contemplates a new, free-flowing composition, suitable for incorporation into a rubber base, comprising: a fluorinated resin, a low molecular weight hydrocarbon, and an inert filler.

Fluorinated resins such as polytetrafluoroethylene powder have been employed in the past as a reinforcing agent for various types of rubbers. Upon curing, with say a peroxide, these rubbers become an elastomer having high tensile strength and elongation properties and low coefficients of friction that permit their use as positive expulsion bladders in corrosive environments such as hydrazine, cable jacketing materials in oil wells, as automobile windshield wiper blades, etc.

U.S. Pat. No. 2,710,290 describes the use of Teflon powder in silicone inorganic rubber, which during mixing, is very soft when compared with commercial polyolefin rubbers such as EPDM. In this instance, Teflon powders do not significantly agglomerate in silicone rubber because high shear stress is not applied during mixing.

By contrast, when polytetrafluoroethylene powders (such as Teflon) are mixed into polyolefin and fluorinated elastomer bases using conventional mixing techniques, the high shear mixing action which occurs causes the Teflon powder to form into strings or other forms of agglomerates during the compounding operation; this in turn affects the uniformity of the eventual elastomer. For example, conventional mixing techniques cause Teflon powder to form visible agglomerates in thin-wall bladders. These are not only unsightly, but also form sites from which a rupture may propagate when the bladder is placed under stress.

Also, these agglomerates impart to the bladder undesirable properties such as erratic permeability to gases, hydrazine, and water. It is, of course, obvious that where Teflon powder is employed not only as a reinforcing agent, but also to resist the intrusion of corrosive chemicals into the rubber base, a high degree of uniform dispersion is necessary in order to maintain a uniform resistance to corrosion, mechanical failure, and permeability throughout all portions of the bladder.

In view of the foregoing, it is an object of this invention to provide a process for incorporating a fluorinated resin into a rubber base as a uniform dispersion.

Another object is to provide, in paste form, a predispersion of a fluorinated resin in a low molecular weight hydrocarbon.

Another object of this invention is to provide a dry free-flowing composition containing a fluorinated resin suitable for uniform incorporation into a rubber base.

Another object of this invention is to provide a rubber composition containing therein a highly dispersed fluorinated resin.

Another object of this invention is to provide cured elastomer moldings free from moisture blisters.

Other objects of the invention will become apparent from the description to follow.

According to the invention, a highly dispersed, particulate fluorinated resin in an organic rubber base may be attained by predispersing the fluorinated resin into a low molecular weight liquid hydrocarbon such as polybutadiene resin to form a paste, and then mixing this paste into the rubber base. The preferred range of fluorinated resin in the polybutadiene resin is 5 to 80 percent by weight. If desired, the paste of the fluorinated resin in the liquid hydrocarbon may be converted into a dry free-flowing powder by the addition of an inert particulate substance, such as clay, carbon black, alumina, silica, coal, sand, etc., using procedures known to those skilled in the art.

Generally, about 75% by weight of the inert material will be sufficient to convert the paste into a dry, free-flowing powder.

As an additional feature, a small amount of the rubber base (e.g., 20% by weight) may be added to the predispersion prior to being mixed into the rubber; this reduces particle classification of the free-flowing powder.

Particulate, fluorinated polymers which may be employed in the blend include polytetrafluoroethylene (Teflon), polychlorotrifluoroethylene (KEL-F), polyvinyl fluoride, polyvinylidene fluoride (KYNAR), copolymers of vinylidene fluoride and hexafluoropropylene (VITON), polyperfluorobutadiene, etc.

To impart suitable properties to the elastomeric compound, the fluorinated polymer should have cold flow properties under milling conditions and possess a higher compression modulus than the host elastomer. This permits the fluorinated polymer to function as a reinforcing agent in the elastomer. The fluorinated polymer is preferably incorporated into the host rubber in the form of small particles, a preferred average particle size varying from at least about 35 to about 350 microns; larger particle sizes may also be used.

British Pat. No. 1,222,001 describes the use of small particle size powdered Teflon in rubber as an extrusion aid. However, the concentrations and particle sizes are so low that no other useful chemical or physical properties are imparted to the rubber base.

By contrast, the present invention employs fluorinated polymers such as Teflon both as a reinforcement and to alter the chemical resistance of the elastomer. The particle sizes are much larger and also the concentration of the Teflon in the rubber base is much greater.

A typical low molecular weight hydrocarbon which may be employed as a medium into which the fluorinated resin is predispersed is a liquid polybutadiene resin sold by the HYSTL Development Co. under the trade name of B-3000; it is produced by the conventional ionic polymerization of 1,3-butadiene. The B-3000 resin contains a minimum of about 80% butadiene groups in the vinyl configuration and about 6% minimum of the unsaturated butadiene groups in the trans configuration. It has a number average molecular weight of 3000±300 as determined by a Hewlett-Packard Vapor Pressure Osmometer (Model 302)

which has been calibrated using pure benzil as a standard.

The preferred number average molecular weight range of the polybutadiene varies from about 500–10000 as measured by the Hewlett-Packard device (supra).

U.S. patent application Ser. No. 153,009 in the names of Jon W. Martin, John F. Jones, and Jeffrey L. Bell, filed June 14, 1971 now abandoned; and U.S. Pat. Nos. 3,741,931 and 3,769,370 teach that the use of butadiene resins of the type described are advantageous in peroxide-cured EPDM rubber compounds because they have the desirable effects that they reduce mixing viscosity, but reinforce the elastomer compound after curing. In particular, modulus and tensile strength are increased, compression set and swelling in oil are decreased, and low temperature properties are improved when high vinyl butadiene resins are co-cured with elastomer bases such as EPDM.

Employing Scanning Electron Microscope technique, it has been determined that the optimum properties of the elastomer result when the admixed polybutadiene resin particles have a maximum size range of 0.5–1.0 microns in diameter and are thoroughly dispersed throughout the polyolefin rubber matrix. This maximum size range is produced when the polybutadiene content varies from about 2% to about 35% by volume of the total composition.

If desired, liquid polybutadienes which are employed may be chain-terminated by reactive groups such as hydroxyl, epoxides, amides, etc. Examples of liquid 1,2-polybutadienes which have these chain-terminating groups are disclosed in U.S. Pat. No. 3,431,235. However, the chain-terminated form of the 1,2-polybutadienes does not appear to confer any particular advantage to the final product; hence, the preferred form of the liquid 1,2-polybutadienes simply employs hydrogen at the ends of the molecule rather than containing reactive chain-terminating groups.

The fluorinated resin may also be dispersed in a low molecular weight oil which is highly compatible with the ingredients of the rubber matrix and includes such oils as naphthenic, paraffinic, etc.

One suitable oil is sold under the name of Cycolube 2310 by the Witco Chemical Co., Golden Bear Division. Cycolube is a paraffinic oil having a viscosity SUS (100°F):1430; aniline point:195°F; average molecular weight:410; and specific gravity (60°F):0.9236.

Another suitable oil is a paraffinic type sold by the Shell Chemical Co. under the trade name of Shellflex 790. It has the following properties: viscosity SSU (100°F):2805; aniline point:250°F; and specific gravity (60°F):0.9042.

Preferred inorganic fillers such as silica, alumina, carbon black, coal, clay, sand, etc., can be incorporated into the mixture to obtain certain desired mechanical properties. These fillers are selected specifically for the environment to be encountered.

A suitable silicon dioxide filler is sold by the Godfrey Cabot Corp. under the trade name of Cab-O-Sil M-5. This material contains more than 99% by weight amorphous silicon dioxide of nominal 12 millimicron particle size and 200±25 m²/g surface area; it is prepared by the high temperature hydrolysis of silicon tetrachloride.

Reinforcing furnace carbon blacks such as ISAF also are suitable. ISAF is sold by the Ashland Chemical Co. as United 220.

Silane-coated hydrated aluminum silicate clay such as that sold by the J. M. Huber Corporation as Nulok 321 may be employed.

Another clay useful as a filler is Translink 37 sold by the Freeport Kaolin Co. This is an amorphous complex aluminum silicate (68% below 2$\mu$)which has been calcined.

Also suitable are ground anthracite coal products such as No. 163 filler sold by H. M. Royal, Inc.

Because of the possibility of moisture adhering to the fluorinated polymer powder and because the moisture permeability of the resulting elastomer is extremely low, it has been found advantageous to add to the compound a low concentration (about 5% by weight) of calcium oxide. The moisture will react with the calcium oxide and be rendered nonvolatile at the rubber cure temperatures.

Typical organic rubber bases which may be employed in this invention include: ethylene/propylene copolymers, ethylene/propylene/diene terpolymers, isobutylene/isoprene copolymers; isoprene homopolymers, isoprene/acrylonitrile copolymers, butadiene homopolymers, urethane polymers, carboxynitroso terpolymers, acrylonitrile/butadiene/carboxy terpolymer, butadiene/acrylonitrile copolymers, isobutylene homopolymers, and styrene/butadiene copolymers.

A typical ethylene/propylene/diene terpolymer (EPDM) which may be employed in this invention is an amorphous material sold by the E. I. duPont de Nemours and Co. Ltd., under the trade name of Nordel 1040. This material has a high molecular weight as shown by its Mooney viscosity value (ML at 250°F) of 40. A correlation of glass transition temperature with ethylene/propylene ratio is reported by J. J. Maurer in Rubber Chem. and Technology 38, 979, (1965). This indicates the Nordel 1040 polymer contains about 25–30 mole-% propylene, about 70–75 mole-% ethylene and 1–2 mole-% unconjugated diene. Several unconjugated dienes may be used to form this general type of terpolymer including 1,4-hexadiene, dicyclopentadiene, methylene norbornene and ethylidene norbornene. Analytical data reported by K. Kiyimoto and S. Nakade in J. Appl. Pollymer Science, 14, 1509, (1969), established that Nordel 1040 contains 1,4-hexadiene as the termonomer. For hydrazine bladders, it was desired that the Nordel 1040 contain no hydrazine reactive material, hence, it was successively extracted with both boiling methyl alcohol and boiling methyl ethyl ketone. It was dried of solvent under vacuum and a small amount of Ionol antioxidant was added by mixing on a two-roll rubber mill. Ionol is 2,6-di-t-butyl-4-methyl phenol and is sold by the Shell Chemical Co.

While many peroxide catalysts will provide the desired crosslinking of the rubber, it is preferred to employ peroxides which have measured half-lives (in benzene solution) at 300°F between 1 second and 30 minutes. An example of such a peroxide is dicumyl peroxide sold by the Hercules Powder Co. as Di-Cup R. This catalyst contains about 98% active dicumyl peroxide and has a measured half-life in benzene solution at 300°F of about 5 minutes. This catalyst generates a curing reaction by the formation of free radicals on the rubber polymer backbone and on the butadiene resin polymer chain.

Lupersol 101, manufactured by the Pennwalt Chemical Co., Lucidol Division, is also suitable. This catalyst has the formula: 2,5-dimethyl-2,5-bis-(t-butyl peroxy)-hexane.

Sulfur cures also may be used providing that the mechanical properties obtained using this cure system are acceptable to the end-use of the rubber compound. In the preferred embodiment of this invention, peroxides are used.

Other preferred catalysts which may be employed should have a suitable half-life at the temperature employed for curing to take place during a reasonable reaction time. Especially suitable are those catalysts of the organic peroxy type such as: di-t-butyl peroxide, 2,-5-dimethyl-2,5-bis(t-butylperoxy) hexyne, n-butyl-4,4-bis (t-butyl perbenzoate), methyl ethyl ketone peroxide, cumene hydroperoxide, di-N-methyl-t-butyl percarbamate, lauroyl peroxide, acetyl peroxide, decanoyl peroxide, t-butyl peroxyisobutyrate, and t-butylperpivalate.

In order to cure the composition, the components are mixed together and then heated for a suitable time and temperature in a closed system. The times and temperatures of the curing reaction are determined by the half-life time of the catalyst at the curing temperature; usually, 5-10 of these half-lives are used which reduces the residual active peroxide content to between 3.125% and 0.098% of the concentration originally added. Cure times may vary from about 5 minutes to 90 minutes while cure temperatures may vary from about 300°F to 400°F. The degree of desired crosslink density will determine the amount of catalyst to be employed, a high crosslink density requiring a larger amount of catalyst. To purge volatiles from the cured composition, a post cure at 350°F for 30 minutes may be employed; oven post cure times of about 2 hours at about 225°F are also effective for this purpose.

The final elastomer composition, of course, will contain little catalyst since it will have been consumed during the 5 to 10 half-lives of the cure reaction.

Preparation of the Teflon predispersion is accomplished using equipment which does not compress the Teflon into agglomerates; hence, Banbury mixers and roll mills are not suitable. Instead, kneading-action mixers, or those known in the plastics industry as dough mixers (such as a Baker-Perkins mixer) are employed. After the predispersion is prepared, remaining components of the elastomer (including the predispersion) are mixed together, followed finally by the cure catalyst. If desired, following the predispersion operation, the elastomer components may be Banbury-mixed or milled together to improve the uniformity of the rubber and blend additives.

EXAMPLE 1

One part by weight of polytetrafluoroethylene powder and four parts by weight of liquid HYSTL B-3000 resin were mixed at about 160°F to 180°F and then cooled to room temperature with continued mixing for a total mixing time of about 1 hour, or until thoroughly dispersed. The mixing is carried out preferably with a Baker-Perkins mixer which is heated to reduce the viscosity of the B-3000. Also, this mixer mechanism does not pinch the polytetrafluoroethylene powder together to form agglomerates, but rather coats the powder with the liquid resin. If a free-flowing mixture of polytetrafluoroethylene powder and B-3000 resin is desired, an inert substance such as 10-50 parts by weight of dry clay per 5 parts by weight of coated powder may be mixed into the dispersion of the B-3000-coated Teflon powder at a temperature preferably about 75°F to 200°F and in any event not exceeding about 300°F.

After the mixture of dispersed polytetrafluoroethylene resin in low molecular weight hydrocarbon (or dry mixture) is prepared, it is then mixed into the rubber base. The peroxide cure catalyst is then added, and curing is conducted to produce the vulcanized elastomer. During the mixing operation, inert fillers and other additives may be added to the elastomer to provide certain desirable mechanical and chemical properties.

EXAMPLE 2

A typical formulation useful as a bladder material for hydrazine service is shown in the accompanying table.

TABLE 1

| COMPONENT | PARTS BY WEIGHT |
|---|---|
| EPDM, Nordel 1040[1] | 100 |
| Filler[2] | 30 |
| Polytetrafluoroethylene Resin[3] | 10 |
| B-3000 Resin[4] | 20 |
| Zinc Oxide[5] | 5 |
| Peroxide[6] | 2 |
| TOTAL PARTS | 167 |
| Press Cure, Min/°F | 30/350° |
| Air Oven Post Cure, Hrs/°F | 2/225° |
| Tensile At Break, psi | 1600 |
| Elongation At Break, % | 350 |
| Shore A Hardness | 88 |
| Die B Tear Strength, pli | 275 |

[1] Extracted by methyl alcohol and methyl ethyl ketone, then dried.
[2] Cab-O-Sil ST-1, Godfrey Cabot Corp. (a hydrophobic grade of fumed $SiO_2$ made by high temperature hydrolysis of silicon tetrachloride followed by a silane reaction to form methyl groups on the surface of the silica particles).
[3] T-5B, Fluorocarbon Corp.
[4] Liquid polybutadiene resin of nominal 90% 1,2-microstructure, MW about 3000, HYSTL Development Co.
[5] Baker Reagent Grade
[6] Lupersol 101, Lucidol Division, Pennwalt Chemical Co.

This bladder formulation was prepared by first dispersing the powdered tetrafluoroethylene resin in the liquid B-3000 to form a paste. A dry free-flowing mixture was then produced by adding a portion of the filler to the paste. The free-flowing mixture was then mixed with the other components including the Nordel 1040 rubber, and cured. The resulting cured elastomer could be molded into O-rings, seals, valve seats, bladders, etc., for use in a hydrazine environment.

EXAMPLE 3

A visual examination of thin sections of a bladder formed from the cured elastomer revealed no visible agglomerates of polytetrafluoroethylene. By comparison, when the tetrafluoroethylene resin was simply mixed together with the components of the elastomer and then cured to form a bladder, visible agglomerates were formed having a particle density of about 21 per square inch.

In another test, thin (0.02 inch) sections of EPDM rubber bladders containing Teflon were viewed by transmitted light. Using the process of the present invention, a formulation containing 3% by weight of powdered Teflon predispersed in HYSTL B-3000 produced no visible agglomerates.

When the Teflon was mixed into the EPDM with no predispersion, Teflon agglomerates were formed with particles as large as 0.05 inch in diameter which were opaque to the same transmitted light.

EXAMPLE 4

To evaluate the permeability of bladder material using the process of this invention, two formulations were prepared identical in composition, but different in procedure (A and B). Formulation A was produced by predispersing the Teflon powder in the B-3000 and converting the dispersion to a free-flowing powder by adding some of the silica, ZnO and CaO. The free-flowing powder was then mixed with the Nordel 1040, the remainder of the silica and finally the peroxide cure catalyst.

Formulation B was produced by simply mixing the ingredients in the conventional manner, followed by the catalyst.

The formulations, mechanical properties, agglomerate density and permeability data are shown in the following table.

TABLE 2

|  | A | B |
|---|---|---|
|  | Parts By Weight | |
| Nordel 1040 | 100 | 100 |
| B-3000 | 20 ⎫ |  |
| T-8A Teflon Powder | 10 ⎬ Masterbatch | 40 |
| ZnO | 5 ⎪ |  |
| CaO | 5 ⎭ |  |
| B-3000 |  | 20 |
| T-8A[1] |  | 10 |
| ZnO |  | 5 |
| CaO |  | 5 |
| Peroxide[2] | 1.0 | 1.0 |
| SiO$_2$[3] | 30 | 30 |
| TOTAL PARTS | 171.0 | 171.0 |
| M$_{100}$, psi, (ASTM D412-64T) (modulus at 100% elongation) | 950 | 600 |
| T$_b$, psi, (ASTM D412-64T) (tensile strength at break) | 1500 | 1550 |
| E$_b$, %, (ASTM D412-64T) (elongation at break) | 375 | 400 |
| Shore A Hardness (ASTM D2240-64T) | 88 | 90 |
| Tear Strength, pli, (ASTM D624-54) | 350 | 350 |
| Permeability to Ambient Hydrazine, mg/cm$^2$-hr | 1.3×10$^{-3}$ | 3.1×10$^{-3}$ |
| Permeability to Helium ($\alpha$P = 30 psia), Scc/cm$^2$-hr | 5.95×10$^{-3}$ | 10.4×10$^{-3}$ |
| Frequency of agglomerated particles visible to the naked eye, number/inch$^2$ | None | 21 |

[1] Fluorocarbon Corp.
[2] Lupersol 101
[3] Methyl silane treated SiO$_2$ (Aerosil 972, deGussa or Cab-O-Sil ST-1, Cabot Corp.)

EXAMPLE 5

An insulated, 12-gauge copper wire was produced by extrusion coating with a cured elastomer of EPDM, clay, calcium oxide, zinc oxide and a predispersion of polytetrafluoroethylene (TFE) powder in HYSTL B-3000. This resulted in an insulation wall thickness of about 0.05 inches. After mounting in epoxy resin, a cross-section was made of this wire which was then scanned repeatedly by an Applied Research Laboratories, Inc. Model EMX electron beam microprobe.

The microprobe was tuned for fluorine using a beam voltage of 10KV. The beam was set 50 microns wide, and a 96-micron per minute rate was used to traverse the insulation section.

A typical readout of the data verified the high degree of fluorine (and, hence, TFE) dispersion. Over the scan, one area approximately 90 microns wide was found with a concentration of about 4% wt. fluorine, indicating a small agglomerate of TFE at, or near, the insulation surface. All other areas of the section show a constant concentration of fluorine indicating that under the instrument conditions, no other fluorine-rich agglomerates were found. As an internal control, the microprobe also was tuned for silicon; this element, as part of the clay, showed a consistent dispersion, as expected.

EXAMPLE 6

An elastomer formulation suitable for use as a cable jacketing material is set forth below.

| PARTS BY WEIGHT | |
|---|---|
| Nordel 1470[1] | 100.0 |
| B-3000 | 20.0 ⎫ Masterbatch |
| T-8A Polytetrafluoroethylene Powder[2] | 5.0 ⎭ |
| Paraffinic Oil[3] | 15.0 |
| Translink 37 Clay[4] | 100.0 |
| ZnO[5] | 5.0 |
| CaO[5] | 5.0 |
| Di-Cup R[6] | 2.0 |
|  | 252.0 |

[1] Nordel 1470 is similar to Nordel 1040, but has a higher viscosity as evidenced by a 70 ML-4 at 250°F. Nordel has a viscosity of 40 ML-4 at 250°F.
[2] Fluorocarbon Corp.
[3] The oil is not employed here to facilitate predispersion of T-8A, but is used to provide desirable mechanical properties.
[4] Freeport Kaolin Co.
[5] Baker Reagent Grade
[6] Hercules Powder Co.

The Teflon was predispersed into the B-3000, then mixed into the rubber base and cured for 20 minutes at 350°F; the following results were obtained.

| | |
|---|---|
| M$_{100}$, psi (ASTM D412-64T) | 1150 |
| T$_b$, psi (ASTM D412-64T) | 1800 |
| E$_b$, % (ASTM D412-64T) | 240 |
| Shore A Hardness (ASTM D2240-64T) | 84 |
| Die B, Tear, pli (ASTM D624-54) | 300 |
| Volume Resistivity: 8000 megohms/1000 ft. | |
| Breakdown Voltage: >60,000 volts d-c | |

A cable employing a similar elastomer as a jacketing material and produced as above functioned for at least 7 weeks in an oil well in the Los Angeles area when employed as an electrical connection.

It will be obvious from the permeability data that use of the predispersed Teflon powder provides a significant improvement in permeability resistance to both hydrazine and helium. In addition, the conventional mixing procedure resulted in numerous visible white agglomerations of Teflon while the predispersion technique provided molded specimens with no visible agglomerations.

Also, M$_{100}$ properties were significantly improved while still retaining the other desired physical properties.

Furthermore, the cured specimens showed no evidence of blisters of the type caused by small amounts of moisture.

What is claimed is:

1. A peroxide-cured, elastomeric, organic rubber base composition comprising:

A liquid derived 1, 2-polybutadiene having a number average molecular weight range from about 500–10,000 and >80% butadiene groups in the vinyl configuration: 2–35% by volume of the total composition;

Particulate fluorinated polymer selected from the class consisting of: polytetrafluoroethylene, polychlorotrifluoroethylene, polyvinylfluoride, polyperfluorobutadiene, polyvinylidene fluoride and copolymers of vinylidene fluoride and hexafluoropropylene: 5%–80% by weight in the polybutadiene polymer;

The said composition formed by predispersing the fluorinated polymer into the liquid polybutadiene to form a paste;

mixing the paste in the organic rubber base; and curing the mixture with a peroxide catalyst.

2. The composition of claim 1 in which the said paste is converted into a free flowing powder with an inert filler.

3. The composition of claim 2 in which said filler is selected from the class consisting of: clay, carbon black, alumina, coal, sand and silica.

4. The composition of claim 2 comprising 10 - 50 parts by weight of filler per 5 parts by weight of paste.

* * * * *